United States Patent [19]
Ouchi et al.

[11] Patent Number: 5,816,127
[45] Date of Patent: Oct. 6, 1998

[54] CONTINUOUS CUTTER FOR SEVERING PIECES OF EQUAL LENGTH FROM A COILED ELONGATE ARTICLE

[75] Inventors: Wataru Ouchi, Shimodateshi; Taizo Morita; Shinya Tagawa, both of Oyamashi, all of Japan

[73] Assignee: Showa Aluminum Corporation, Osaka, Japan

[21] Appl. No.: 73,586

[22] Filed: Jun. 8, 1993

[30] Foreign Application Priority Data

Sep. 7, 1992 [JP] Japan ................................. 4-238208

[51] Int. Cl.⁶ .................................................. B23D 21/00
[52] U.S. Cl. ................................ 83/318; 83/320; 83/454; 72/203; 225/2; 226/119
[58] Field of Search ............................. 83/454, 455, 456, 83/318, 319, 320; 72/203, 205, 332; 225/2; 226/119

[56] References Cited

U.S. PATENT DOCUMENTS

| | | | |
|---|---|---|---|
| 2,741,309 | 4/1956 | Czarnik | 83/319 |
| 3,129,624 | 4/1964 | Aver | 83/320 |
| 3,805,654 | 4/1974 | Plegat | 83/319 |
| 4,188,812 | 2/1980 | Nomura et al. | 72/203 |
| 4,724,733 | 2/1988 | Suarez et al. | 83/320 |
| 4,771,621 | 9/1988 | Sato | 226/119 |
| 4,939,967 | 7/1990 | Wallis | 83/318 |
| 5,133,492 | 7/1992 | Wohrstein et al. | |
| 5,143,268 | 9/1992 | Stroup, Jr. | 225/2 |
| 5,219,113 | 6/1993 | Noé | 72/205 |
| 5,249,345 | 10/1993 | Virsik et al. | 225/2 |

FOREIGN PATENT DOCUMENTS

| | | |
|---|---|---|
| 0391747 | 10/1990 | European Pat. Off. . |
| 2739327 | 3/1979 | Germany . |
| 2410578 | 9/1985 | Germany . |
| 62-003840 | 3/1987 | Japan . |
| 63-272412 | 11/1988 | Japan . |
| 1-41413 | 5/1989 | Japan . |
| 3-124337 | 5/1991 | Japan . |

*Primary Examiner*—Maurina T. Rachuba

[57] ABSTRACT

A continuous cutter for severing pieces of equal length from a coiled elongate article "T" includes a movable stand which carries a shiftable clamp. The cutter also includes a fixed clamp. The shiftable and fixed clamps are driven relatively to one another to clamp or unclamp the article "T" fed from an uncoiler and to advance it in an intermittent manner for the production of flat tubes used to construct a heat exchanger. For this purpose, a cutter blade on the movable stand severs the elongate article into lengths during the forward advance of the stand, in such a manner that the lengths are cut accurately, efficiently and at a reduced production cost. A stretcher may be added to the cutter in order to impart a the moving article "T".

15 Claims, 9 Drawing Sheets

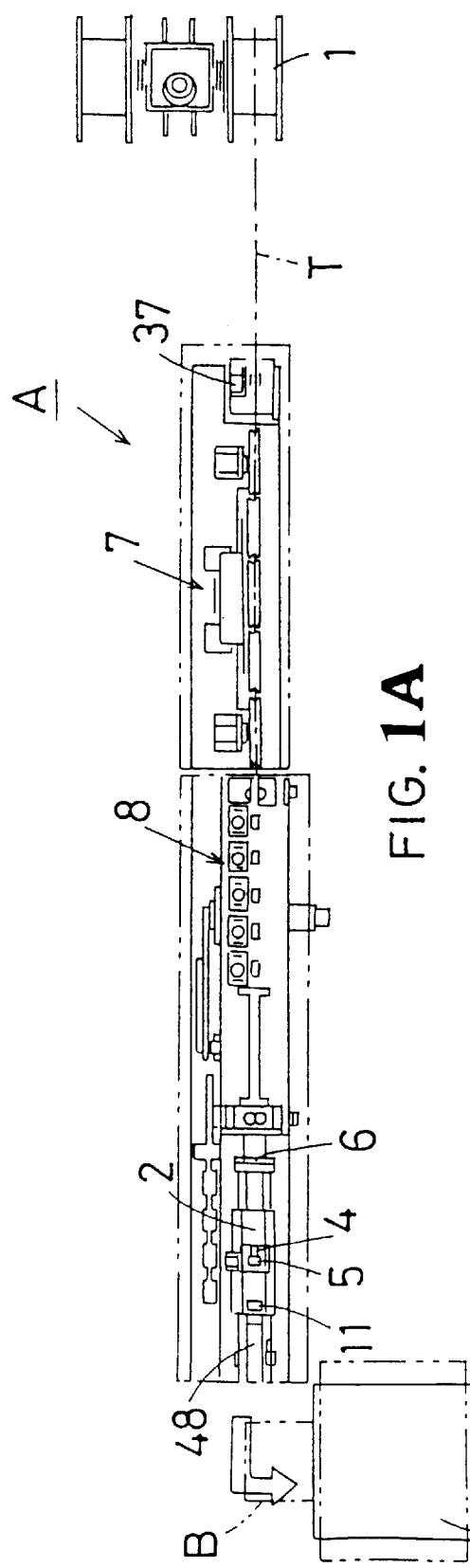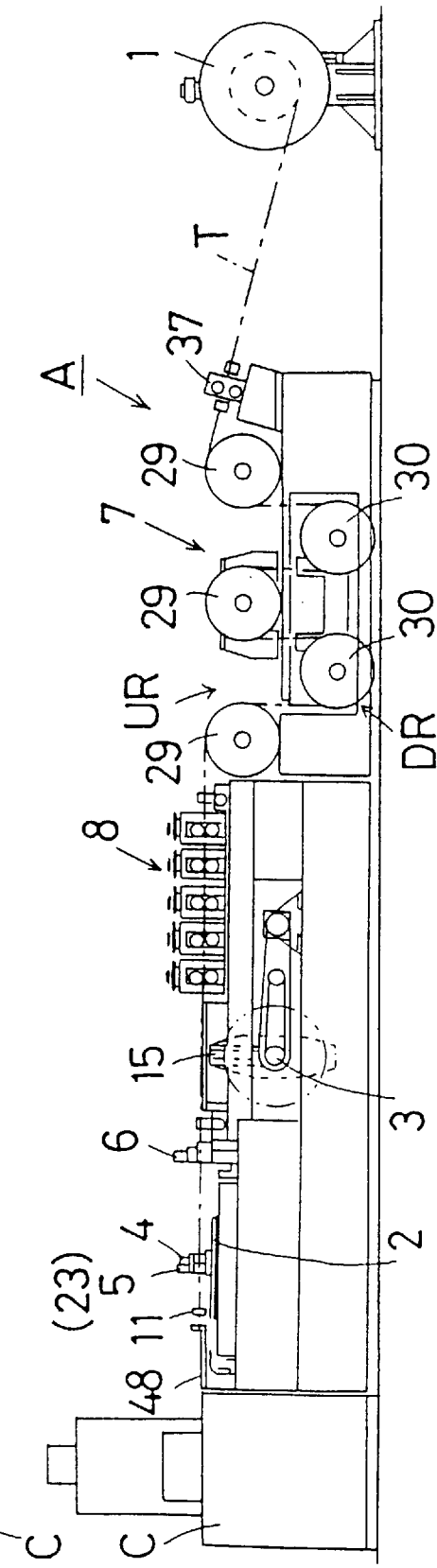

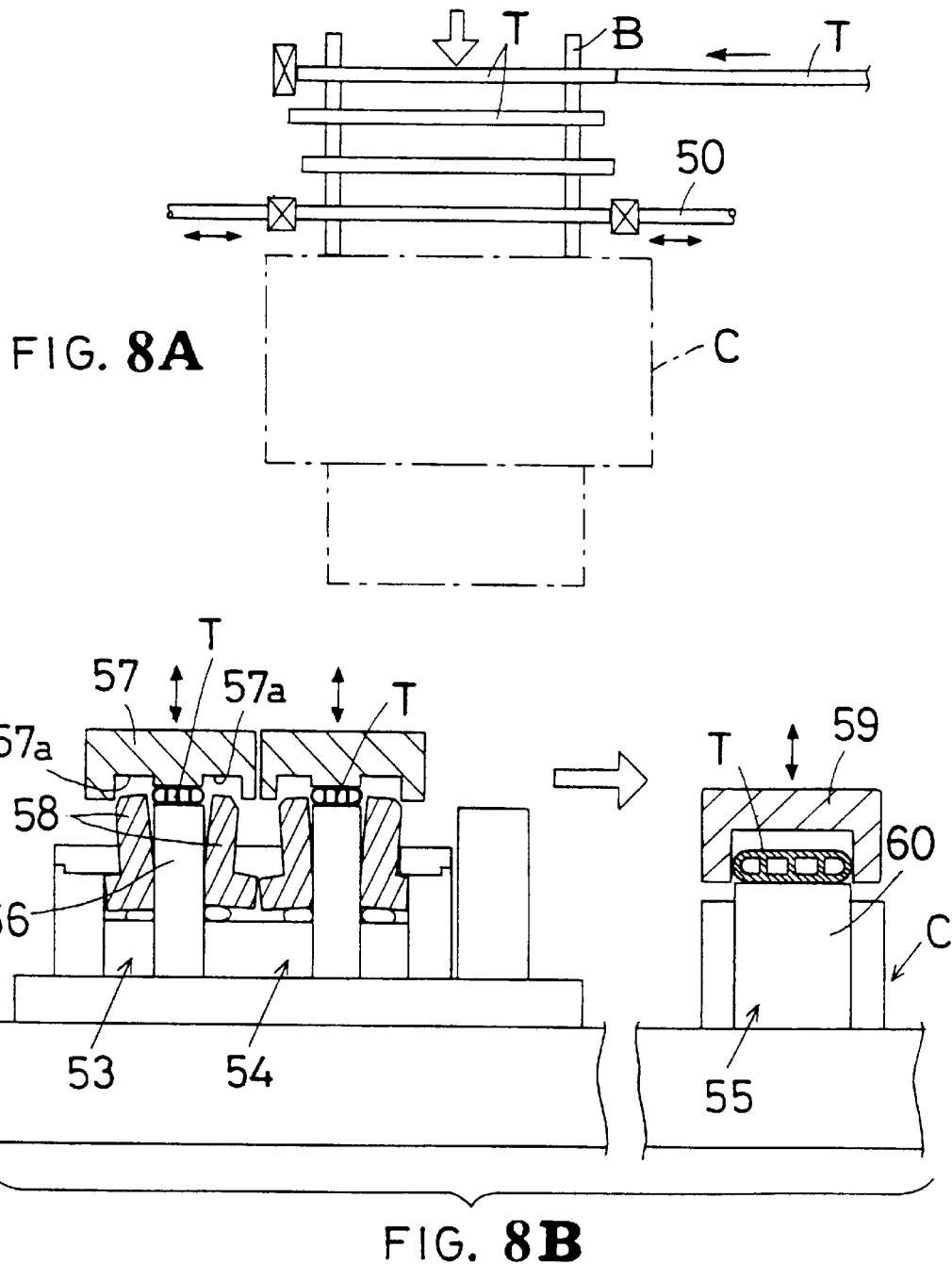
FIG. 8A
FIG. 8B
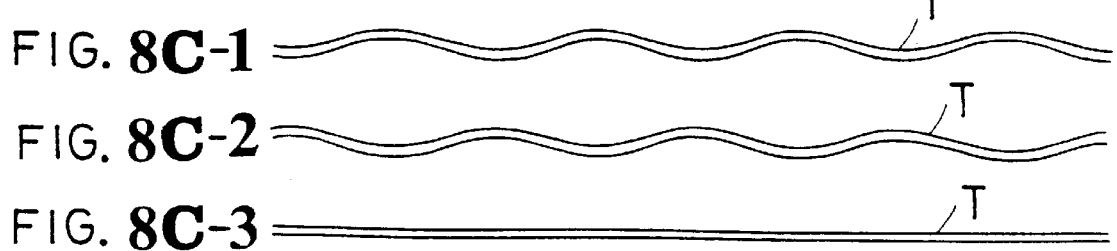
FIG. 8C-1
FIG. 8C-2
FIG. 8C-3

CONTINUOUS CUTTER FOR SEVERING PIECES OF EQUAL LENGTH FROM A COILED ELONGATE ARTICLE

BACKGROUND OF THE INVENTION

1. Field of The Invention

The present invention relates to a continuous cutter for severing pieces of equal length from a coiled elongate article, for example an extruded aluminum tubular article used to prepare heat exchanger tubes.

2. Description of The Prior Art

Serpentine type of heat exchangers have been employed widely as condensers in car cooling systems. Such heat exchangers comprise a single elongate tubular element bent in a meandering manner to form a core. In contrast, a multi-flow or parallel-flow type heat exchanger comprises short tubes that extend between a pair of hollow headers with opposite ends in fluid communication with the headers. This multi-flow type heat exchanger is compact; yet it affords a higher heat exchange efficiency and a lower pressure loss of coolant. Accordingly, its use is increasing.

In general, the short tubes for the multi-flow type heat exchanger are manufactured by: extruding an elongate tubular article through an extruder; stretching and processing the extruded article by means of equipment associated with the extruder; and then cutting the article into pieces of a given equal length.

This method is disadvantageous in that each extruded elongate article should have a definite length not greater than that allowed by a limited floor space around the extruder. When the elongate tubular articles are each cut to produce tubular pieces of predetermined equal length, any end piece that is smaller than that given length must be discarded. This results in a lowered yield of tubes per raw elongate article.

A number of alternatives have been proposed to resolve the above-identified problems. In some of the alternatives, an increased length of an elongate tubular article is wound on a reel in unison with the extrusion process. The article thus coiled is drawn by an uncoiler rotatably holding the reel so that other apparatus may sever tubes of equal length from the article.

According to one of the alternatives mentioned above, the process of pulling the article off the uncoiler by a given distance is repeated. A pause occurs between successive pulling operations, and a cutter located beside the uncoiler severs a length from the article during that pause. In another alternative, a drive roll rotates at a constant speed to continuously draw the elongate article from the reel, and a cutter reciprocates to cut the article in unison with its movement.

It is however impossible to stretch the tubular elongate article which is being coiled on the reel immediately after extrusion. Thus, the elongate article must be stretched after or during the cutting of it. In the case where the cut lengths are stretched, it is difficult to establish a practical and efficient method of stretching. Thus, efforts have been made to develop a method in which the article is stretched while being cut into predetermined lengths.

For example, Japanese Examined Patent Publication Hei. 1-41413 discloses a method of cutting an elongate tubular article into tubes of equal length for use in the serpentine type heat exchanger. This method is performed using a pair of front and rear clamps, a front cutting device disposed adjacent the front clamp and to the rear of it as well as a rear cutting device disposed adjacent to the rear clamp and in front of it. The front clamp is movable back and forth so that the elongate article can be gripped at its leading end by the front clamp and drawn a desired distance. The rear clamp grips the drawn article at the rear end of the article, and the front and rear clamps impart a tension to the article and stretch it. Subsequently, the front and rear cutting devices cooperate with one another to simultaneously cut the front and rear ends of the article to sever a given length of tube from it. These procedures are repeated by retracing the front clamp to draw a succeeding portion of the article.

As summarized above, the intermittently uncoiled elongate article must pause for each length of tubing, so that the loss of time increases markedly when a number of tubes are severed from that article. This loss has a severe, negative impact on the efficiency of production of the multi-flow type heat exchangers, because each exchanger requires many tubes.

In the other case where the cutting devices are driven in unison with the movement of continuously drawn article, the control of such simultaneous motion is very difficult, resulting in poor precision. An extraordinarily sophisticated apparatus is needed to accurately cut to a predetermined length, thus raising the equipment cost to an undesirable level.

Although the method proposed by the Japanese Patent Publication referred to above is suited to the simultaneous cutting and stretching of the elongate articles, the stretching operation will increase the duration of each cycle and significantly reduce the speed of cutting, thus, lowering production efficiency.

SUMMARY OF THE INVENTION

A first object of the present invention which avoids the disadvantages of the prior art is therefore to provide a continuous cutter that severs pieces of equal length from a coiled elongate article more efficiently, more accurately and at a lower production cost.

A second object of the invention is to provide a continuous cutter for severing pieces of equal length from a coiled elongate article while simultaneously imparting tension to it.

The first object is achieved by a continuous cutter for severing pieces of equal length from a coiled elongate article, the cutter comprising: an uncoiler for carrying the elongate article wound thereon so as to be drawn therefrom; a movable stand disposed in front of the uncoiler and reciprocating movement; a drive mechanism causing the movable stand to reciprocate a given distance; a shiftable clamp carried by the movable stand so as to clamp and unclamp the elongate article; a cutter blade mounted on the movable stand in front of the shiftable clamp; and a fixed clamp interposed between the uncoiler and movable stand so as to clamp and unclamp the elongate article. The shiftable clamp is kept in its clamping state, with the fixed clamp simultaneously being in its unclamping state, during the forward movement of the movable stand. The fixed clamp is kept in its clamping state, with the shiftable clamp simultaneously being in its unclamping state, during the backward movement of the movable stand. During each forward movement of the movable stand, the cutter blade severs each piece from the elongate article drawn off the uncoiler.

The drive mechanism referred to above preferably comprises a crank mechanism which causes the movable stand to periodically reciprocate. The crank mechanism has a simple structure which accurately transports the elongate article a predetermined distance in every cycle.

The second object is achieved by the continuous cutter described above which further comprises: a stretcher disposed between the fixed clamp and the uncoiler. The stretcher includes a row of upper rollers as well as a row of lower rollers being disposed in a zigzag arrangement. The elongate article from the uncoiler advances through the stretcher while successively turning around the lower rollers in a meandering manner.

A third object of the invention is to offer a continuous cutter which further comprises, in addition to the members described above in connection with the first or second object, a correcting device disposed rearwardly of the fixed clamp and including pairs of rollers.

A fourth object of the invention is to provide a continuous cutter in which the shiftable clamp described above has surfaces for clamping the elongate article, with at least one of the surfaces being formed with protrusions designed to tightly engage the article.

In the cutter of the present invention described above, the clamping conditions change twice at each reciprocation of the movable stand, for both the shiftable and fixed clamps. Therefore, the shiftable clamp will intermittently advance the elongate article the same distance at each reciprocation. Since the leading end portion of the article is severed by the cutter blade mounted on the movable stand while it is advancing, it need not pause at its forward position. Thus, the movable stand can make more reciprocating movements per unit time and, accordingly, improve production efficiency.

The clamps repeat to advance the elongate article an accurate distance. The shiftable clamp mounted on the movable stand and carried by it together with the cutting blade will always maintain its position relative to the blade. Since, as noted above, each piece is severed from the article which is being advanced by the shiftable clamp on the movable stand, a higher accuracy in the dimension of severed pieces is achieved by the present invention.

In the cutter of the present invention which achieves the second object, the inertia and tension or the like of the advancing article being pulled by the movable stand will raise the lower rollers of the stretcher a predetermined distance. The resulting force applied to the advancing article will stretch it between the uncoiler and the shiftable clamp before it is cut into pieces of equal length.

In the cutter which achieves the third object, the elongate article which advances from the uncoiler but remains somewhat bent is further forced through the correcting device. This device straightens the article before it is cut into pieces of equal length.

In the cutter of the present invention which achieves the fourth object, the protrusions formed on the clamping surface not only protect the gripped portion of the article from collapsing, but also prevent it from slipping on the clamping surface, thus ensuring precision in its delivery from the uncoiler.

Further objects and advances of this invention will become clear in the embodiments which will be given hereinafter only by way of examples to demonstrate the preferred modes. Therefore, this invention is not limited to those embodiments but permits many other modifications falling within the range and spirit of the invention.

BRIEF DESCRIPTION OF THE DRAWINGS

FIG. 1A is a side elevation view of one embodiment of the continuous equal-length cutter of the present invention;

FIG. 1B is a plan view of the cutter of FIG. 1A;

FIG. 8A is a plan view showing a layout of a tube-transporting device in combination with a finishing press;

FIG. 8B is a side elevation view, showing the finishing press, partly in cross section;

FIG. 8C is a side elevation view of the tubing, wherein the schemes C-1, C-2, and C-3 illustrate different states of the tube.

THE PREFERRED EMBODIMENTS

Figure 9:
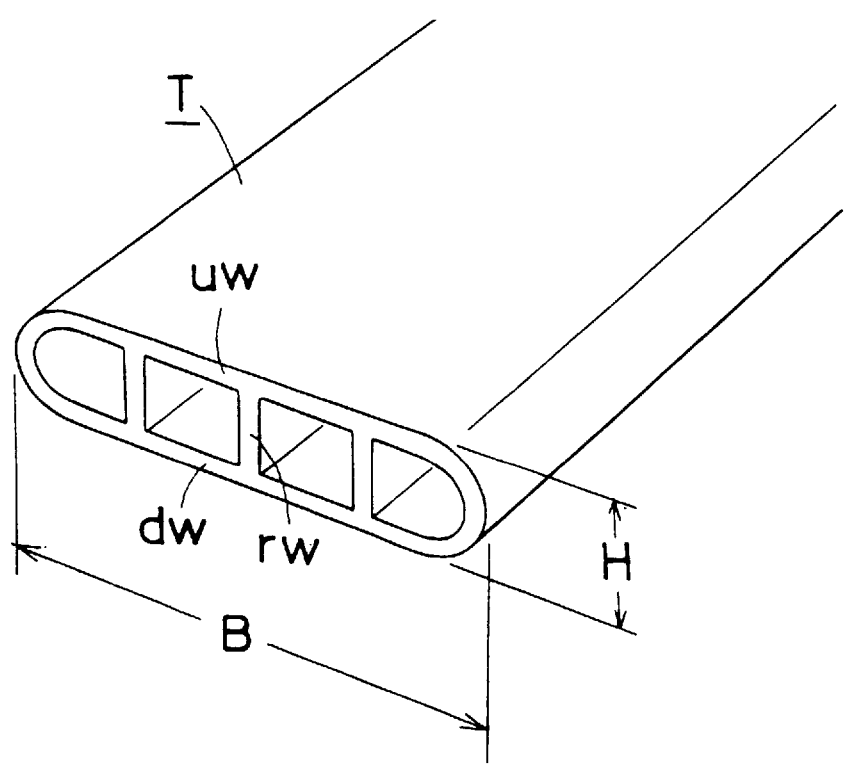
FIG. 9 is a perspective view of one example of tubing which is used as a tubular element in a heat exchanger.

The following detailed description of an embodiment of the present invention refers to the drawings which show the tubes of a heat exchanger as an example of the tubes processed by the present invention. A tubing "T" is an elongate article extruded from aluminum and having a flat cross section as shown in FIG. 9. Its upper wall "uw" is connected by reinforcing partitions or walls "rw" to its lower wall "dw", to form a so-called "harmonica tube". By way of an example, its width "B" is 16 or 20 mm, and its height "H" is 2 or 3 mm. The cutter of the present invention produces short tubes or pieces of equal length (e.g., 285–750 mm).

In FIGS. 1A and 1B, the symbol "A" generally denotes a continuous "constant-length" cutter, and the symbol "B" denotes a conveyer, with the further symbol "C" denoting a finishing press. The continuous "constant-length" cutter generally comprises: an uncoiler 1; a movable stand 2; a drive mechanism 3; a shiftable clamp 4; a cutting device 5; a fixed clamp 6; a holder 11 for holding a severed end; a stretcher 7; and a correcting device 8.

Most of the tubing "T" is wound around the uncoiler 1 to thereby form a coil. A motor, which is built in the uncoiler, facilitates unloading the tubing.

Figure 2:
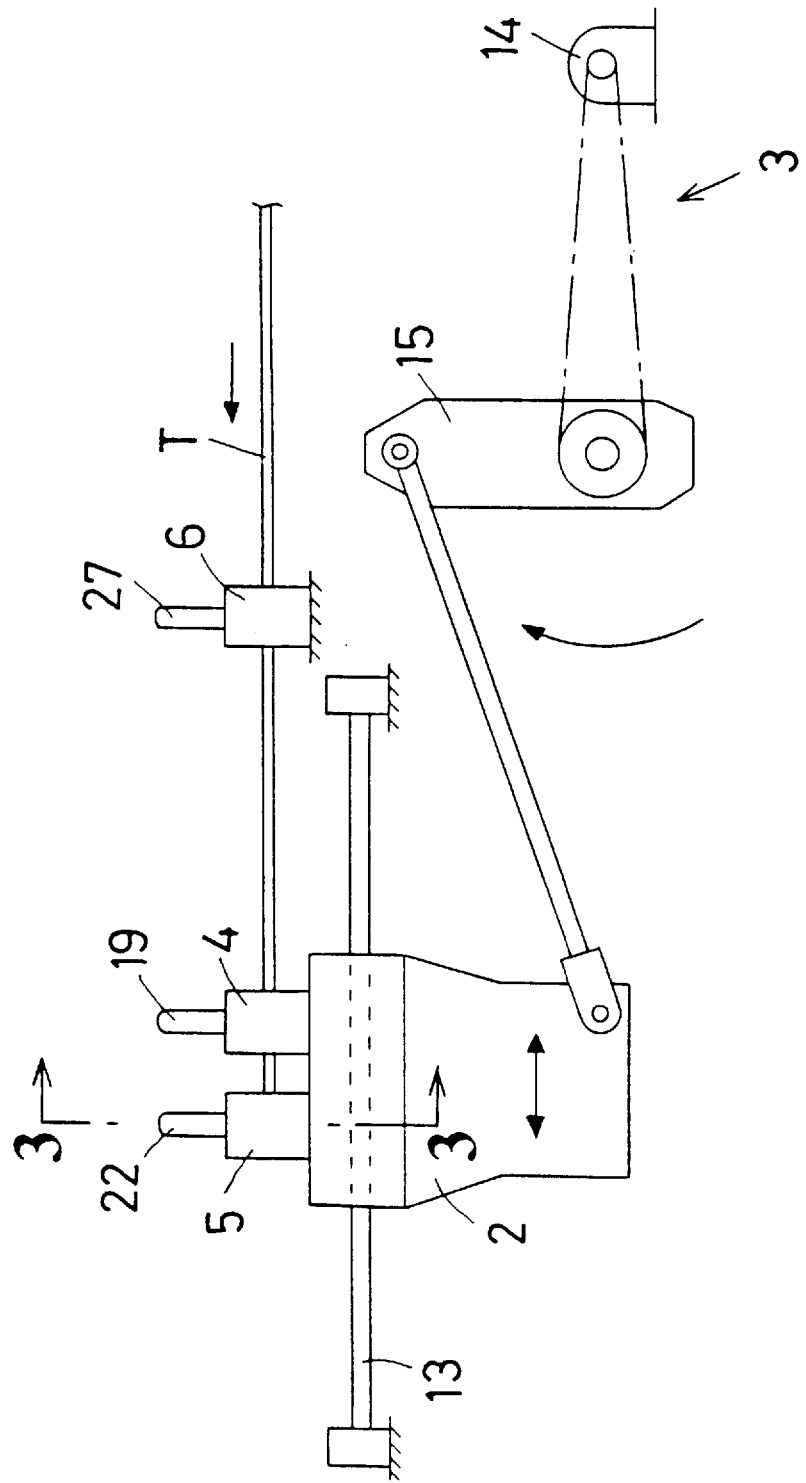
FIG. 2 is a side elevation view, showing a movable stand, a drive mechanism, a fixed clamp, a shiftable clamp as well as a cutting device and other member of the cutter of FIGS. 1A and 1B.

The movable stand 2 disposed in front of the uncoiler 1 and remotely from it moves back and forth along a guide means 13, in the manner shown in FIG. 2.

The drive mechanism 3 comprises a motor 14 as well as a crank 15. The crank 15 converts the output of the motor into linear motion which is transmitted to the movable stand 2 and causes the stand to reciprocate back and forth a given distance.

Figure 4A:
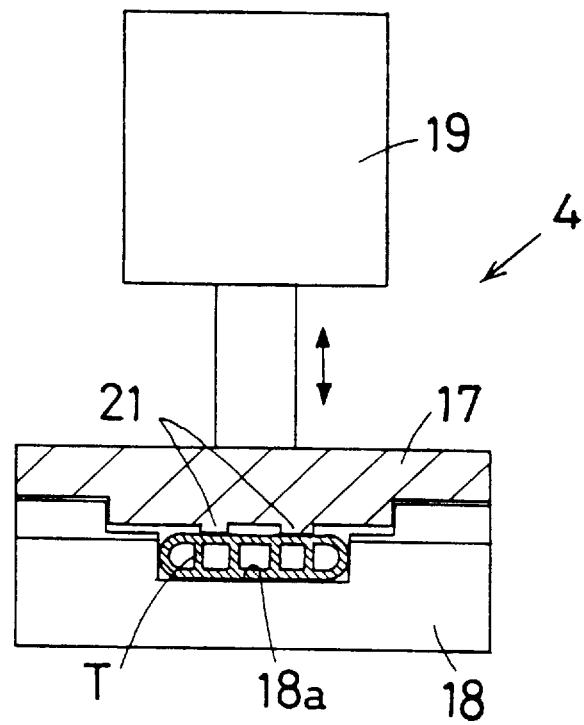
FIG. 4A is a front elevation view of the shiftable clamp.
Figure 4B:
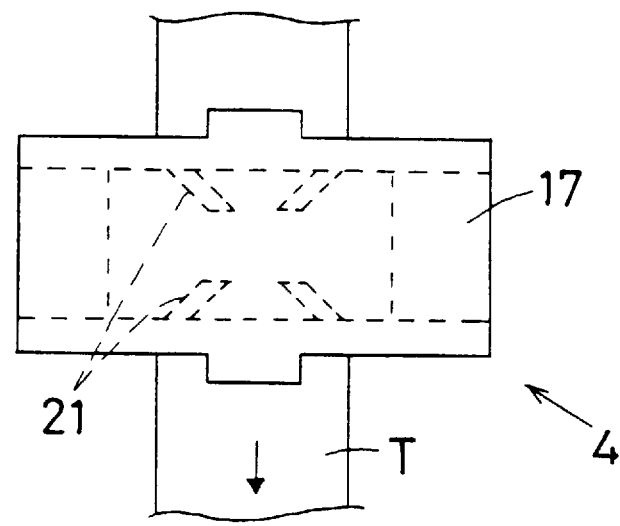
FIG. 4B is a plan view of an upper clamper in the shiftable clamp.

The shiftably clamp 4 is secured to the movable stand 2 to reciprocate in unison with it. It comprises an upper clamper 17 and a lower clamping base 18, as shown in FIGS. 4A and 4B. The clamping base 18 is fixed to the movable stand 2. Its upper surface includes a guide groove 18a. A pneumatic cylinder 19 raises and lowers the upper clamper 17. The tubing "T" lies within the guide groove 18a; and the lowered upper clamper 17 and the clamping base 18 press the tubing between them.

It is preferable to interpose a coiled spring (not shown) between the upper clamper 17 and the pneumatic cylinder 19. The cylinder will not directly press the tubing "T", but the coiled spring will do so temperately and reliably.

The cylinder 19 keeps the upper clamper 17 in its lowered position during the forward movement of the movable stand 2 and in a retracted position during the backward movement of the movable stand. This co-operation of the members enables the intermittent delivery of the tubing "T" from the uncoiler by equal length corresponding to the stroke of the movable stand.

A mechanical valve such as a rotary air valve controls the pneumatic cylinder 19. This valve allows the cylinder to make a quick response to the motion of the crank mechanism 15.

As shown in FIGS. 4A and 4B, the upper clamper 17 has a lower surface formed with protrusions 21, which prevent the unwound tubing "T" from slipping relative to the clamper. The protrusions 21 extend in a direction across the tubing "T", and most preferably assume a cruciform skewed at an angle of 45° with respect to the tubing. Such a shape will prevent the slipping of the tubing.

Figure 3A:
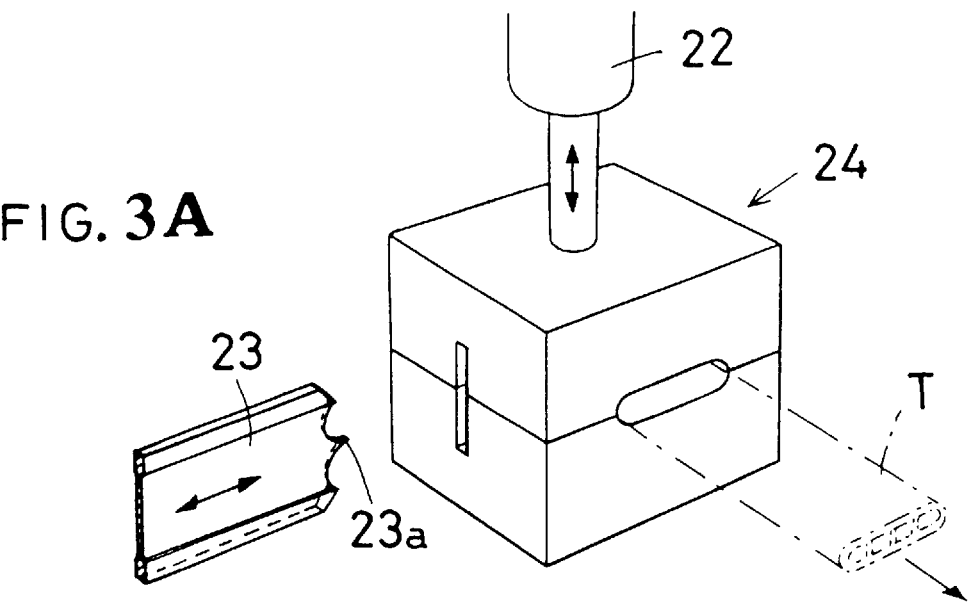
FIG. 3A is an overall perspective view of the cutting device.
Figure 3B:
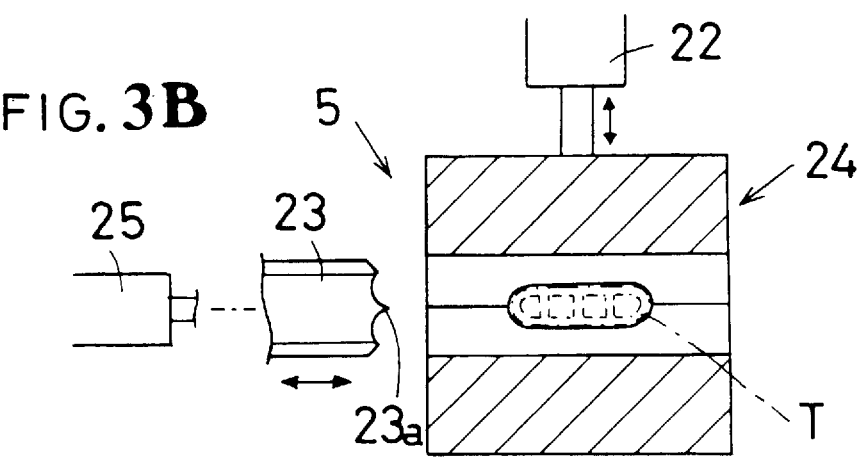
FIG. 3B is a cross section taken along line 3—3 in FIG. 2.
Figure 3C:
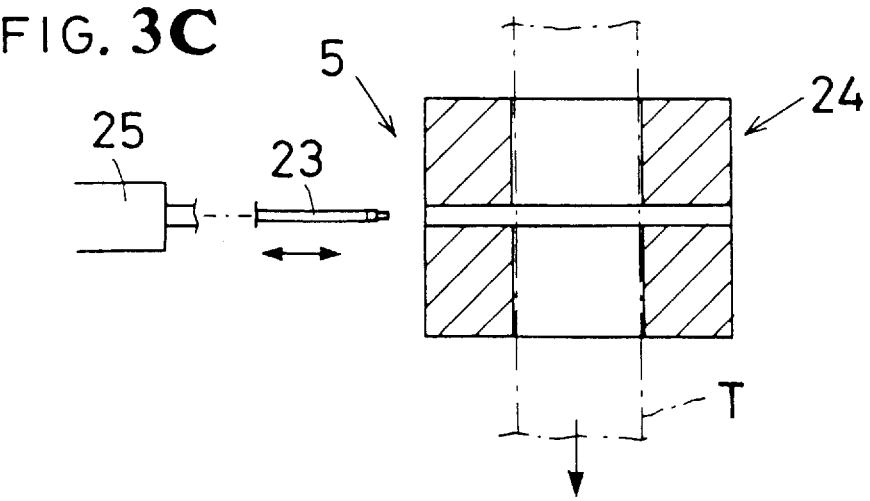
FIG. 3C is a plan view, showing the cutting device partly in cross section.

The cutting device 5 for cutting the elongate tubing "T" is disposed in front of the shiftable clamp 4 and integral with the movable stand 2, as illustrated in FIGS. 1A, 1B and 2. FIGS. 3A, 3B and 3C show that the cutting device 5 comprises a cutter blade 23 and a cutting block 24.

The cutter blade 23 is a "cutting-off" type, and it lies beside the travel path of the tubing "T". A cylinder 25 drives this blade from one lateral side of the tubing to "cut-off" the tubing. Cutting the flat harmonica-shaped tubing "T" in this manner effectively protects the cut portion from deformation.

The edge of this blade 23 is especially designed and comprises an upper and lower concave portion and a central, pointed protrusion 23a interposed between the concave portions and jutting forth from them.

The cutter blade 23 takes its out-thrust position after the movable stand 2 has started forward. Subsequently, the blade moves to its retracted position once the stand reaches its forward end position. It remains at the retracted position during the backward movement of the stand 2. In this way, the tubing is cut while the movable stand 2 is advancing forward. The activation of the drive cylinder 25 for the blade 23 must, therefore, be highly responsive to the reciprocating movement of the movable stand. A mechanical valve may be employed to control the cylinder 25 in response to the motion of the crank mechanism 15, and accordingly to the reciprocating movement of the movable stand.

The cutting block 24 clamps and holds the tubing "T" proximate the cutter blade 23 which cuts it. Since the portion of the tubing "T" has its outer periphery tightly covered with the inner surface of the cutting block 24, the cutter blade does not deform the tubing proximate the location where it cuts it. The cutting block 24 preferably clamps the tubing at two areas—in front of the blade 23 and in the rear of it. The clamping of the tubing's portion in the rear of the blade ensures accurate positioning of the tubing by the block. In the tubing to the rear of the blade 23, the cutting block 24 also acts as a fixed blade opposite the cutter blade. The clamping of the tubing's portion in front of the blade is effective to grip a rearward end of the piece severed from the tubing "T". Alternatively, the cutting block 24 may be designed to only grip the tubing portion in front of the blade or in the rear of the blade. The reference numeral 22 denotes a drive cylinder actuating the cutting block. A mechanical valve may be employed to control the cylinder 22 in response to the motion of the crank mechanism 15.

The fixed clamp 6 is shown in FIGS. 1A, 1B and 2, and is fixedly interposed between the uncoiler 1 and the movable stand 2. Like the shiftable clamp 4, this fixed clamp has an upper clamper and a lower base, with a cylinder 27 driving the upper clamper.

The drive cylinder 27 for the upper clamper remains retracted during the forward movement of the stand 2, but it moves to its projected state during backward movement of the stand. As a result, the clamp 6 does not hinder the forward movement of the movable stand 2 when it drags the tubing "T" forward, and the backward movement of shiftable clamp 4 carried by the stand does not push back the tubing. A mechanical valve may also be employed here to control the cylinder 27 in response to the motion of the crank mechanism 15, and accordingly the reciprocating movement of the movable stand.

Figure 5:
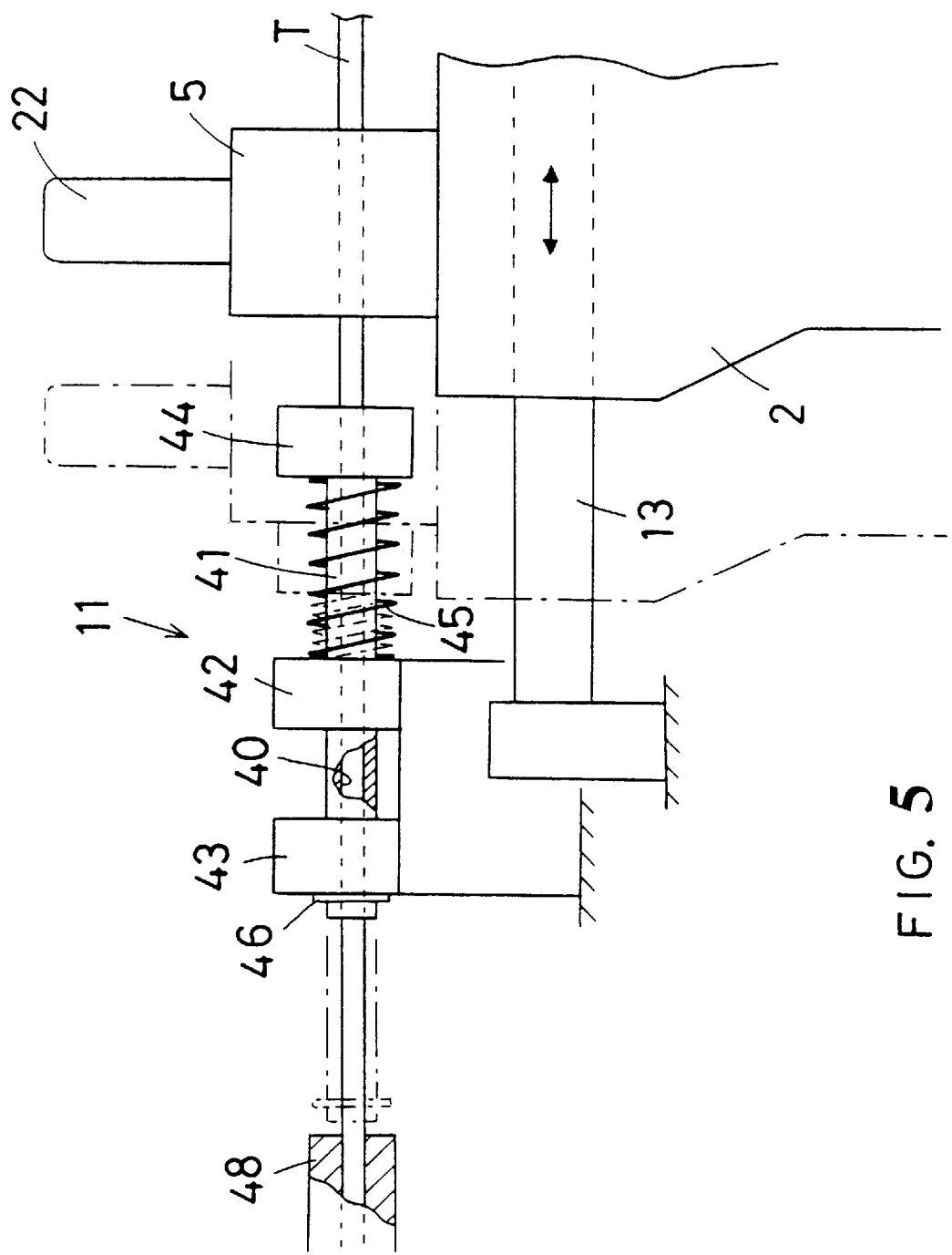
FIG. 5 is a side elevation view of a holder which receives a cut end of a tubing severed by the cutter.
Figure 6:
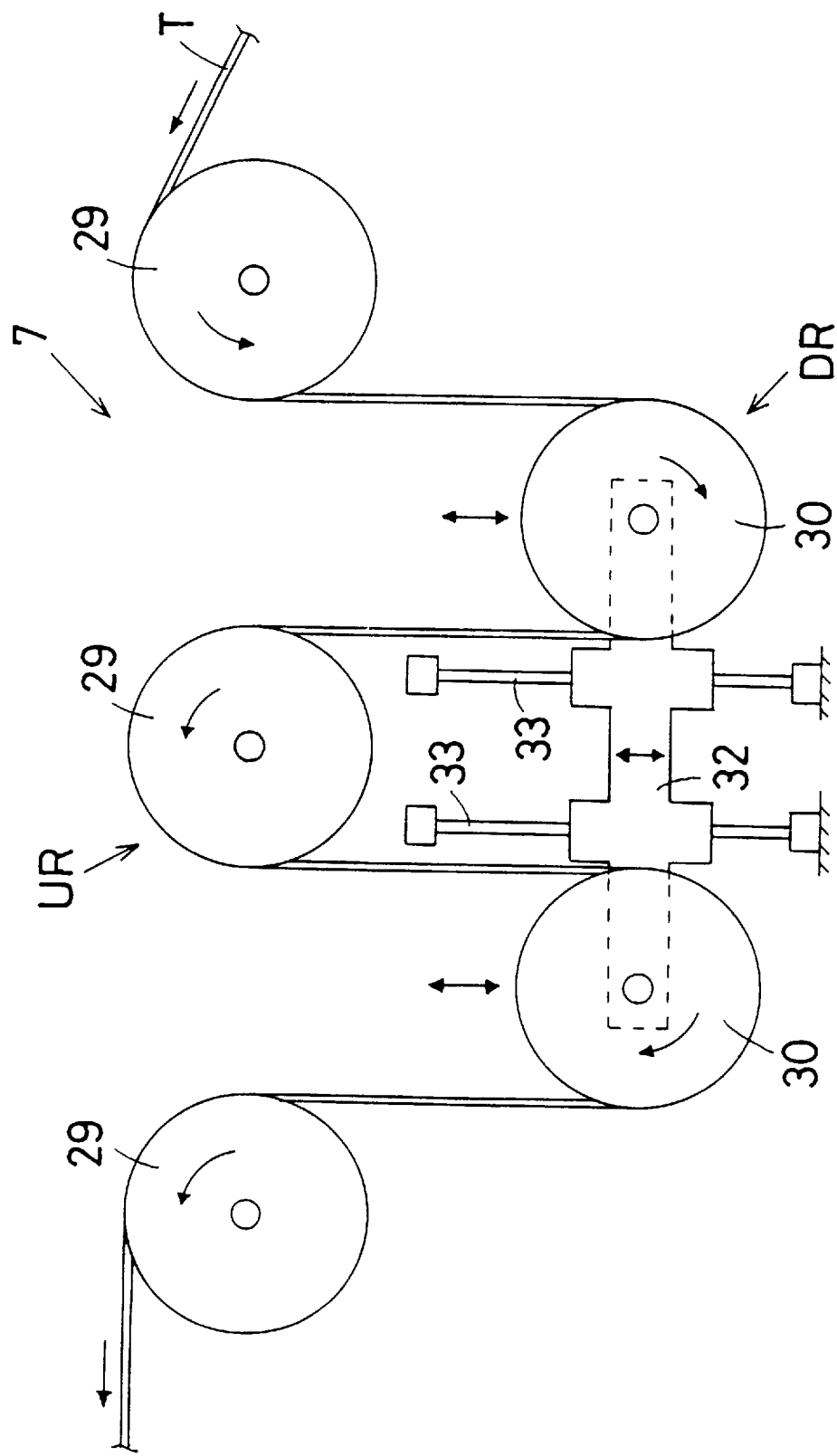
FIG. 6 is a side elevation view showing a stretcher employed in the cutter.

A holder 11 is equipped to hold in place and protect the leading end of the cut portion of the tubing "T" from being vibrated during the backward movement of the stand 2. The holder 11 lies in front of the movable stand 2, as shown in FIG. 1. As shown in detail in FIG. 5, the holder 11 comprises a slidable rod 41 supported by a pair of front and rear thrust bearings 43 and 42. The slidable rod 41 has an axially extending bore 40 and is driven back and forth. A cut end receiver 44 is fixed to the rear end or the slidable rod. A coiled spring 45 is disposed between the rear bearing 42 and the receiver 44 to urge the receiver 44 away from the bearing 42 a given distance. A stopper 46 is attached to the front end of the rod 41.

In operation, the cutting device 5 on the movable stand 2, when moving forward, comes into contact with the cut end receiver 44. The front surface of the device 5 then pushes the rod 41 forward against the elastic force of the spring 45 and moves the rod to a forward position shown in phantom in FIG. 5. Upon arrival at its forwardmost position, the movable stand 2 starts to return, allowing the spring 45 to push the rod 41 backward. As a result, the front end of the tubing "T" moves into the axial bore 40 of the rod through the receiver 44.

A guide 48 lies in front of the rod 41 in coaxial relation with it. The pieces of equal length severed from the tubing "T" will enter this guide one by one.

The stretcher 7, which imparts tension to the tubing "T" to work harden it, lies between the uncoiler 1 and the fixed clamp 6 as shown in FIGS. 1A and 1B. The tension-applying stretcher 7 comprises an upper row "ur" of three rollers 29 and a lower row "dr" of two rollers 30. The upper rollers 29 are spaced from one another and are disposed at fixed positions. Each lower roller 30 is interposed between two adjacent upper rollers 29, so that all the upper and lower rollers are arranged in zigzag relation A tying frame 32, which is connected to shafts of the lower rollers 30, slides along guide rods 33 and 33. Therefore, the two lower rollers move up and down synchronously with one another. They usually take their lowermost position under the force of gravity. They move upward when an upward force exceeds a critical strength greater than the gravity.

A balancer may preferably be employed to adjust the critical strength and to thus control the tension imparted to tubing "T".

Figure 7:
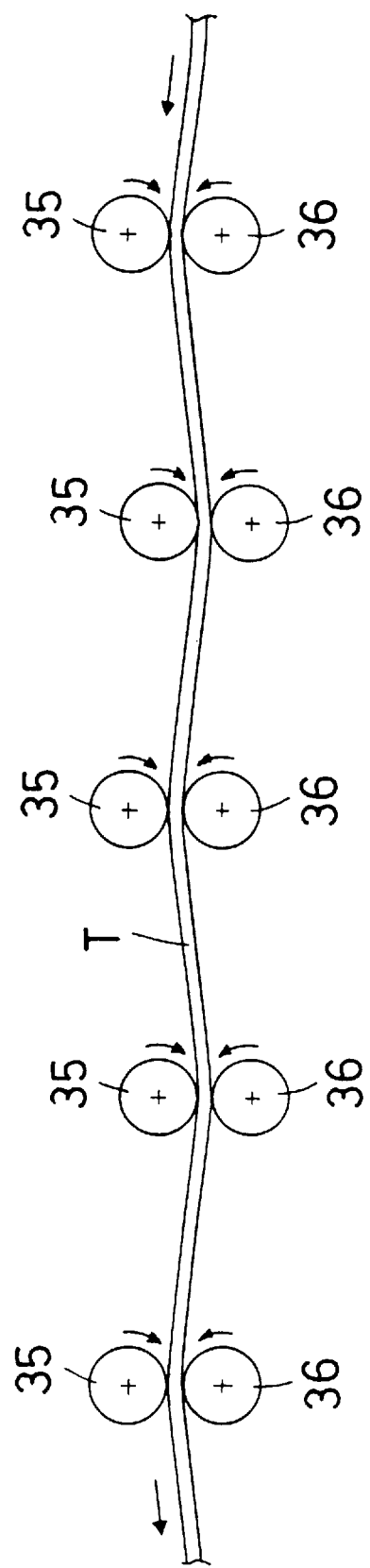
FIG. 7 is also a side elevation view, showing a correcting device composed of rollers and employed in the cutter.

As shown in FIGS. 1A and 1B, the correcting device 8 for straightening the somewhat bent tubing "T" is disposed between the stretcher 7 and the fixed clamp 6. This device 8 comprises several pairs of upper rollers 35 and lower rollers 36. The roller 35 of each pair is spaced from the roller 36 by a distance substabntially equal to the thikness of the tubing "T". The pairs are arranged at substantially regular predetermined intervals. FIG. 7 shows that each pair of the rollers 35 and 36 is disposed slightly higher or lower than the neighboring two pairs so that the tubing "T" meanders a little when advancing through the pairs.

The reference numeral 37 in FIGS. 1A and 1B denotes a guide roller assembly for leading the tubing "T" from the uncoiler 1 to a predetermined lateral position on the stretcher 7.

In operation, but before starting of the cutter "A", the tubing "T" is unwound from the uncoiler 1 and fed to the stretcher 7 through the guide roller assembly 37. Then, the tubing is transferred successively from one roller 29 or 30 to another 30 or 29 in a manner such that the lower peripheral surface of each lower roller 30 is kept in contact with the meandering tubing. This tubing "T" will further be put through the correcting device 8 and into the shiftable clamp 4, via the fixed clamp 6. Subsequent to these preparatory steps, the drive mechanism 3 is activated to initiate the "constant-length" delivery of the tubing "T" which will be accurately cut into pieces of equal length as already described above.

In detail, the switchover from the backward movement to the forward movement of the movable stand 2 causes the shiftable clamp 4 to grip the tubing "T", synchronously causing the fixed clamp 6 to unclamp the tubing, until the tubing has moved forward a predetermined distance. The reverse switchover from the forward movement to the backward movement of the movable stand 2 causes the shiftable clamp 4 to unclamp the tubing "T", synchronously causing the fixed clamp 6 to grip it. Therefore, the movable stand 2 is allowed to smoothly return to its rear end position, while the tubing "T" is kept stationary by the fixed clamp 6. This cycle will be repeated to intermittently take a length of the tubing "T" from the uncoiler. This length corresponds to the stroke of the movable stand 2.

The cutter blade 23 protrudes during the forward movement of the stand 2, whereby the tubing "T" is cut into pieces of equal length.

The cut end of the tubing whose leading end portion is severed in this way will enter the axial bore 40 of the rod 41 in the holder 11. This motion is ensured, as already noted above, by the force of the cutting device 5 against the cut end receiver 44 of the rod 41. This force causes the forward displacement of the receiver against the spring 45, which thereafter moves the receiver 44 backward in unison with the backward moving stand 2. In this way, the cut end of the tubing "T" is protected from vibration or deformation.

The severed piece is pushed forward by the cut end of the tubing so as to penetrate the rod 41 in the holder 11 and enter the tube guide 48.

It will now be apparent that the forward pulling of the tubing "T" by the given distance is repeated accurately, by virtue of not only the switchover of the clamping state of the shiftable clamp and the fixed clamp 6 but also the reciprocation of the movable stand 2. The cutter blade 23 on the stand 2 also reciprocates in unison with the shiftable clamp 4 which repeats to grip the tubing "T" and which intermittently moves the tubing forward a given distance. This structure of the present invention is advantageous in that pieces of equal length can be severed from the tubing even if the activation of the cutter blade 23 is done at any desired time during the forward movement of the stand 2.

Because the cutter blade 23 finishes its cutting action on the tubing "T" before the movable stand 2 reaches its forwardmost position, the stand can turn back immediately. This feature increases the number of the stand's forward and backward movements per unit time, thus affording a higher efficiency. In addition, all the drive cylinders are controlled by mechanical valves which respond quickly to the crank mechanism 15, resulting in a more efficient and accurate cutting operation. For example, in this embodiment, the pieces of equal length are severed from the tubing at the rate of one piece per 0.84 second.

Since the movable stand 2 need not make a pause when it returns, it is possible to employ herein the crank mechanism 15 to simplify the overall drive system and also to reduce the total cost of this apparatus, without adversely affecting its precision.

The cutting block 24 continues to grip the rear end of severed piece in front of the cutter blade 23, until the stand reaches its forward end positions where the block is made free. This ensures a smooth transfer to the next cycle.

As described above, the tubing "T" dragged forward by the stand 2 exerts within the stretcher 7 an inertia to forcibly raise the lower rollers 30 against their weight, whereby a significant tension is imparted in an efficient manner to the tubing dragged from the uncoiler 1, thus effecting the "work hardening" of the tubing.

The adaption of the stretcher 7 effects the efficient "work hardening" of the tubing intermittently dragged from the uncoiler 1.

Preferably, a moderate braking resistance may be applied to the uncoiler 1 rotated by the forwardly moving stand 2, in order to keep constant and optimum the tension of the tubing "T".

In addition, due to a rapid succession of sharp turns which the tubing "T" makes around the upper and lower rollers 29 and 30, the "work hardening" effect is enhanced while eliminating the remaining corrugation from the tubing.

The passage through the correcting device 8 straightens the tubing "T", and its gentle meander through the device 8 is not only useful to the efficient work hardening but also assists the device to more effectively straighten the tubing and to control its height, i.e., thickness "H".

The tubes "T" severed in this way in the cutter "A" will be loaded on the conveyer "B" through the guide 48 shown in FIG. 8(A). This conveyer transports the tubes in an intermittent manner into the finishing press "C", via a centering device 50 for correcting the tube's lateral position.

FIG. 8(B) shows the finishing press "C" comprising a first to third pressing sections 53–55. The first section 53 corrugates each of the tubes "T" into a shape shown at "C-1" in FIG. 8(C). The second section 54 further corrugates them at a different angular phase as shown at "C-2" in FIG. 8(C). The third section 55 finally presses and straightens them as shown at "C-3" in FIG. 8(C). This processing is done to produce additional "work hardening" of the tubes and to straighten them.

Another object of the finishing press process is to correct each tube's width and thickness. FIG. 8(B) shows two pressing die assemblies used in the first and second sections 53 and 54. Each assembly comprises a lower die 56 and an upper die 57 cooperating with each other to corrugate the tube. The assembly also includes a right die 58 and a left die 58 which cooperate with one another to correct the tube's width. With the upper die 57 being move downward, its right and left recesses 57a respectively receive the upper ends of the right and left dies 58 and force them towards each other. Both the lateral sides of the tube "T" are thus pressed inwardly to correct its width. As for its thickness, it is corrected mainly by the upper and lower dies 59 and 60 in the third section, though the other upper and lower dies 57 and 56 in the second section will also serve this purpose to some extent.

After the finishing press, the severed rough ends of each piece from the tubing "T" are trimmed off in the "cutting-off" manner. The sizing or swaging of the ends of each piece, reinforcing by corrugation, and/or final flattening of each tube may follow the step of trimming before the finished tube "T" is output from this manufacture line.

In summary, the cutter meets the first object. Each stroke of the stand causes the fixed and shiftable clamps to repeat their clamping state to thereby intermittently drag the tubing out of the uncoiler a given distance. The blade cuts the tubing during the forward movement of the movable stand so that the stand need not pause at its foremost position, increasing the number of strokes repeated per unit time and improving the production efficiency.

Further the clamps of the cutter allow the cutter to pull forward an accurate length of tubing during each stroke of the stand. A constant distance kept between the cutter blade and the shiftable clamp, which are carried by the stand, has a beneficial effect on the highly accurate severing of the pieces of equal length by means of the blade acting on the tubing held in place by the clamp. Therefore, notwithstanding the simplicity in structure, the cutter operates precisely and at a lowered running cost.

The continuous cutter meets the second object. The stretcher between the fixed clamp and the uncoiler includes the upper and lower rows of rollers disposed in zigzag relation so that the dragged tubing meanders around the lower peripheries of lower rollers. These lower rollers are forced upward by the inertia of the advancing tubing. Their weight and the force raising them impart a tension to the tubing. Thus, the smooth and rapid advancement of the tubing is not disturbed even with considerably high tension applied to the tubing.

The cutter meets the third object and includes the correcting device which straightens the more or less curved tubing from the uncoiler so that straight pieces can be severed from the tubing.

The cutter meets the fourth object and includes the shiftable clamp having a clamping surface formed with protrusions that strongly grip the tubing without collapsing it. Accordingly the tubing does not slip and disturb its smooth and reliable movement.

What is claimed is:

1. A continuous cutter for severing pieces of equal length from a coiled elongate article, the cutter comprising:

an uncoiler for carrying the elongate article wound thereon so as to be drawn therefrom;

a movable stand disposed downstream of the uncoiler for reciprocating movement;

a drive mechanism for causing the movable stand to reciprocate a given distance;

a shiftable clamp carried by the movable stand so as to clamp and unclamp the elongate article;

a cutter blade mounted on the movable stand downstream of the shiftable clamp;

a fixed clamp interposed between the uncoiler and the movable stand so as to clamp and unclamp the elongate article;

the shiftable clamp being kept in its clamping state with the fixed clamp simultaneously being in its unclamping state during the downstream movement of the movable stand, the fixed clamp being kept in its clamping state with the shiftable clamp simultaneously being in its unclamping state during the upstream movement of the movable stand;

the cutter blade severing each piece from the elongate article being drawn off the uncoiler during each downstream movement of the movable stand; and a stretcher disposed between the fixed clamp and the uncoiler, the stretcher including upper rollers arranged stationary at given intervals and lower rollers each interposed between two adjacent upper rollers and movable up and down, so that the elongate article from the uncoiler advances through the stretcher while successively turning around the lower rollers in a meandering manner, and the lower rollers can be raised against their weight during the intermittent advancement of the elongate article drawn off the uncoiler.

2. A continuous cutter as defined in claim 1, wherein the drive mechanism comprises a motor and a crank which converts the output of the motor into a linear reciprocating motion of the movable stand.

3. A continuous cutter as defined in claim 1, wherein the fixed clamp has an upper clamper and a lower base, and the upper clamper is driven vertically so as to keep its raised position during the downstream movement of the movable stand and to keep its lowered position during the upstream movement thereof so that a tubing as the elongate article is pressed toward and kept stationary on the lower base, and wherein the shiftable clamp similarly has an upper clamper and a lower base, and the upper clamper is driven vertically so as to keep its lowered position during the downstream movement of the movable stand so that the tubing is pressed toward and kept stationary on the lower base and to keep its raised position during the upstream movement of the movable stand.

4. A continuous cutter as defined in claim 1, wherein the drive mechanism comprises a motor and a crank which converts the output of the motor into a linear reciprocating motion of the movable stand, wherein the fixed clamp has an upper clamper and a lower base, and the upper clamper is driven vertically by a pneumatic cylinder so as to keep its raised position during the downstream movement of the movable stand and to keep its lowered position during the upstream movement thereof so that a tubing as the elongate article is pressed toward and kept stationary on the lower base, wherein the shiftable clamp similarly has an upper clamper and a lower base, and the upper clamper is driven vertically by a further pneumatic cylinder so as to keep its lowered position during the downstream movement of the movable stand so that the tubing is pressed toward and kept stationary on the lower base and to keep its raised position during the upstream movement of the movable stand, and wherein both the pneumatic cylinders for actuating the fixed and shiftable clamps are controlled by respective mechanical valves which response to the motion of the crank.

5. A continuous cutter as defined in claim 1, wherein the lower rollers are connected to each other by a tying frame so as to be raised and lowered in concert with one another.

6. A continuous cutter as defined in claim 4, wherein the lower rollers take their lowermost position under the force of gravity.

7. A continuous cutter as defined in claim 4, further comprising a correcting device between the stretcher and the fixed clamp.

8. A continuous cutter as defined in claim 7, wherein the correcting device comprises pairs of upper and low rollers, and the distance between the upper and lower rollers in each pair is substantially equal to the thickness of the tubing, and wherein one such pair is disposed slightly higher or lower than the adjacent other pairs so that the tubing is caused to gently meander through the pairs of the rollers.

9. A continuous cutter as defined in claim 1, wherein the shiftable clamp has surfaces for clamping the elongate article, with one of the surfaces being formed with protrusions designed to tightly engage with the article.

10. A continuous cutter as defined in claim 9, wherein the protrusions assume a cruciform skewed at an angle of 45° relative to the tubing.

11. A continuous cutter as defined in claim 1, wherein the cutter blade is controlled to take its out-thrust position after the movable stand has started downstream, then to take its retracted position once the stand reaches the downstream end, and thereafter to remain at its retracted position during the upstream movement of the stand.

12. A continuous cutter as defined in claim 1, wherein the cutter blade has an upper and lower concave portions and a central, pointed protrusion interposed between the concave portions and jutting forth from them.

13. A continuous cutter as defined in claim 1, wherein the drive mechanism comprises a motor and a crank which converts the output of the motor into a linear reciprocating motion of the movable stand, and wherein the cutter blade is actuated by a drive cylinder which in turn is controlled by a mechanical valve responsive to the motion of the crank.

14. A continuous cutter as defined in claim 1, further comprising a cutting block carried by the movable stand and composed of an upper half and a lower half which cooperate with one another to clamp the tubing at two positions downstream and upstream of the cutter blade, wherein a slit is formed through the cutting block so as to allow the cutter blade to be inserted sideways into the cutting block.

15. A continuous cutter as defined in claim 1, further comprising a holder disposed downstream of the movable stand, with the holder keeping in place and protecting the leading end of the cut portion of the tubing from being vibrated during the upstream movement of the movable stand.

* * * * *

UNITED STATES PATENT AND TRADEMARK OFFICE
CERTIFICATE OF CORRECTION

PATENT NO. : 5,816,127
DATED : October 6, 1998
INVENTOR(S) : Wataru Ouchi et al.

It is certified that error appears in the above-indentified patent and that said Letters Patent is hereby corrected as shown below:

Column 4, line 59, delete "shiftably" and substitute therefor
-- shiftable --.

Signed and Sealed this

Twenty-third Day of March, 1999

Attest:

Q. TODD DICKINSON

Attesting Officer

Acting Commissioner of Patents and Trademarks